(12) United States Patent
Matsumoto

(10) Patent No.: US 6,507,922 B1
(45) Date of Patent: Jan. 14, 2003

(54) FAULT INDICATOR CIRCUIT IN SYSTEM HAVING CIRCUIT BLOCKS

(75) Inventor: Tooru Matsumoto, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/534,424

(22) Filed: Mar. 23, 2000

(30) Foreign Application Priority Data

Jul. 9, 1999 (JP) ............................................ 11-195449

(51) Int. Cl.[7] ................................................. H02H 3/05
(52) U.S. Cl. ......................... 714/57; 361/115; 700/293
(58) Field of Search ............................ 714/57, 14, 22, 714/30, 44, 48; 324/133; 340/664; 361/80, 115; 700/293; 323/207; 257/335

(56) References Cited

U.S. PATENT DOCUMENTS

| | | | | |
|---|---|---|---|---|
| 4,199,029 A | * | 4/1980 | Marek ........................... | 169/28 |
| 5,068,604 A | * | 11/1991 | Van de Lagemaat ........ | 324/537 |
| 5,181,091 A | * | 1/1993 | Harrington et al. .......... | 257/355 |
| 5,325,062 A | * | 6/1994 | Bachand et al. ............. | 324/133 |
| 5,343,507 A | * | 8/1994 | Arnold et al. ............... | 376/203 |
| 5,390,081 A | * | 2/1995 | St. Pierre .................... | 361/752 |
| 5,530,335 A | * | 6/1996 | Decker et al. ............... | 136/293 |
| 5,784,237 A | * | 7/1998 | Velez ........................... | 361/115 |

* cited by examiner

Primary Examiner—Robert Beausoliel
Assistant Examiner—Rita A Ziemer
(74) Attorney, Agent, or Firm—Katten Muchin Zavis Rosenman (57) ABSTRACT

The present invention discloses a fault indicator circuit in a system having a plurality of circuit blocks each provided with an individual power source. Each of the circuit blocks needs to indicate a fault when a fault occurs in the individual power source of the circuit block. The fault indicator circuit of the present invention includes a fault indicator which performs fault indication in response to a fault indication control signal from the circuit block having the fault or one of the other circuit blocks. When a fault occurs in the individual power source of a circuit block, the fault indicator performs fault indication by means of power supplied from the individual power source of one of the other circuit blocks. An input determiner which reduces the level of the fault indicator control signal outputted from one of the other circuit blocks is disposed at the input terminal of a gate circuit into which the fault indication control signal is inputted from one of the other circuit blocks. Thus, the fault indicator of each circuit block can be prevented from being wrongly activated due to a fault in the individual power source of one of the other circuit blocks.

4 Claims, 8 Drawing Sheets

FAULT INDICATOR CIRCUIT IN SYSTEM HAVING CIRCUIT BLOCKS

BACKGROUND OF THE INVENTION

1. Field of the Invention

The present invention generally relates to fault indicator circuits, and, more particularly, to a fault indicator circuit in a system having a plurality of circuit blocks each provided with an individual power source.

In a communication or information processing system having a plurality of circuit blocks each provided with an individual power source, if the individual power source of one of the circuit blocks is broken, it is necessary to indicate the fault occurrence by the use of power supplied from the individual power source of one of the other circuit blocks, so as to visually show which circuit block is out of order. Such fault indication is carried out by switching on a light-emitting diode of the broken circuit block, for instance.

2. Description of the Related Art

In a conventional communication or information processing system, a common power source which supplies power for a plurality of circuit blocks is generally employed, instead of individual power sources for the respective circuit blocks. A fault indication in using a common power source is carried out by the use of power from a primary source in a common power source unit (an input power source for driving the common power source). Since the primary source is a high-voltage power source, it is difficult to employ an IC. Instead of an IC, elements such as relays are used, resulting in a large-size circuit. It is difficult to carry out fault indication when individual power sources are power by one primary source.

Meanwhile, in a system provided with individual power sources, when a fault occurs in the individual power source of one of the circuit blocks, the circuit block needs to receive power from one of the other circuit blocks, because its own power source is no longer available. Therefore, the circuit block with the broken power source receives power from one of the other circuit blocks as well as a fault indication control signal. When a fault occurs in a component other than the individual power source, the circuit block with the broken component needs to indicate the fault occurrence on its own, because one of the other circuit blocks can supply power and the fault indication control signal only as long as the circuit block supplying power to the faulted circuit block is in a normal operation state. Accordingly, it is necessary to supply fault indication power from the faulted circuit block and one of the other circuit blocks. Also, two types of fault indication control signals are required: one is for indicating a fault in the individual power source, and is supplied from one of the other circuit blocks; and the other is for indicating a fault in a component other than the individual power source, and is supplied from the circuit block with the broken component itself. To drive an indication element such as a light-emitting diode (LED) with the two control signals, a method which uses open collectors as shown in FIG. 1 is conventionally employed.

Figure 1:
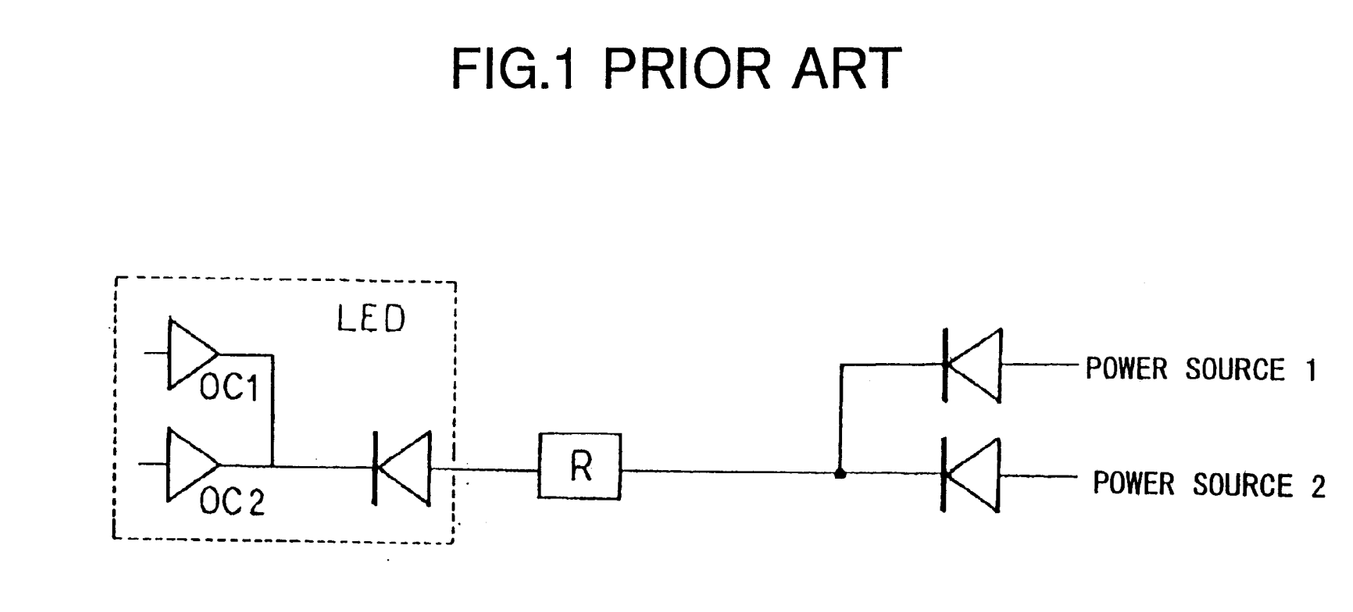
FIG. 1 shows a circuit for transmitting fault indication control signals using open collectors.

FIG. 1 shows a circuit for transmitting fault indication control signals using open collectors. In this figure, OC1 and OC2 denote open collectors which are output gates for control signals. LED stands for a light-emitting diode. A fault indication signal for indicating a fault which cannot be detected and controlled by the circuit block (such as a fault in the individual power source) and a fault indication control signal which can be detected and controlled by the circuit block are inputted into the open collectors OC1 and OC2. respectively. When a control signal is generated, the light emitting diode LED emits light by means of power supplied from a power source 1 or a power source 2. When the individual power source of the power-supplying circuit block is broken, however, the open collector circuit that is the output gate for a control signal from the power-supplying circuit block does not stop as it is expected to (high impedance in the output state: HiZ). The power source for indicating fault occurrence might reach a certain voltage through a signal conductor from the power-supplying circuit block, because a CMOS (Complimentary MOS) is often used today due to the high-performance interface between circuit blocks. Here, the circuit blocks are printed boards, and the individual power source of each circuit block is called an on-board power source.

Figure 2:
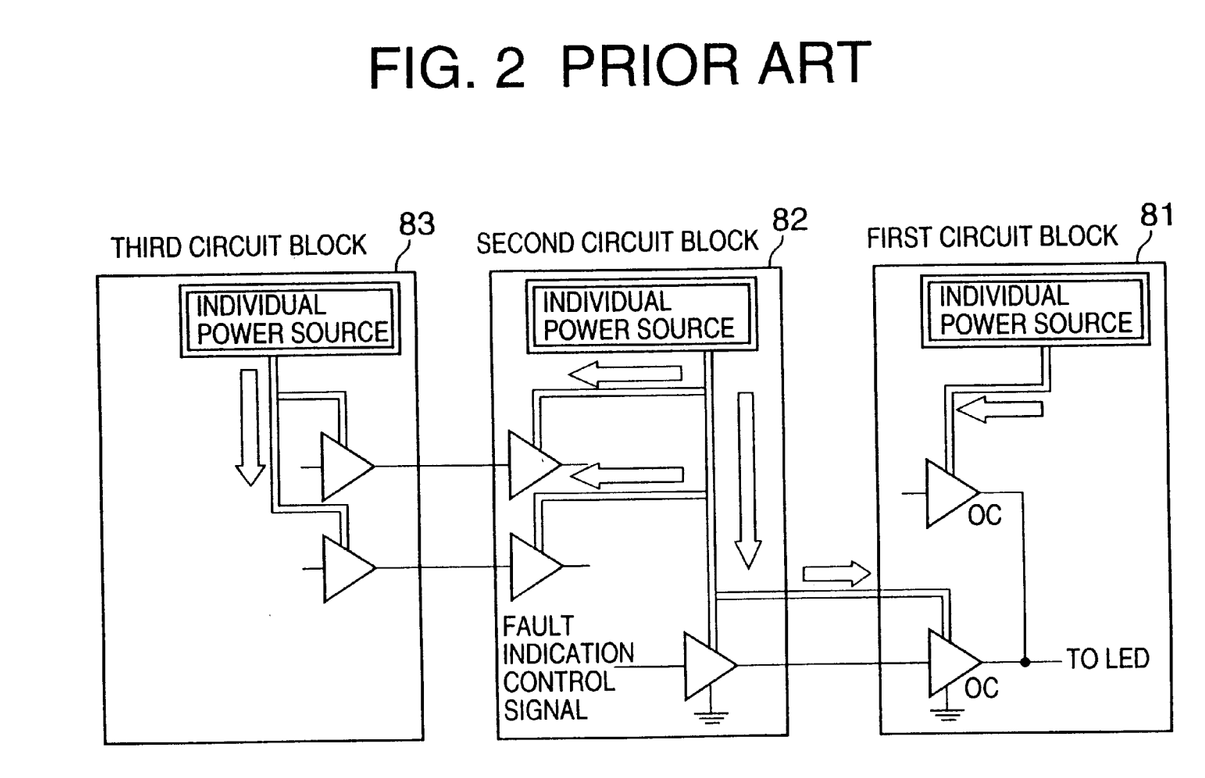
FIG. 2 shows the relationship between circuit blocks when a fault occurs in a power source.
Figure 3:
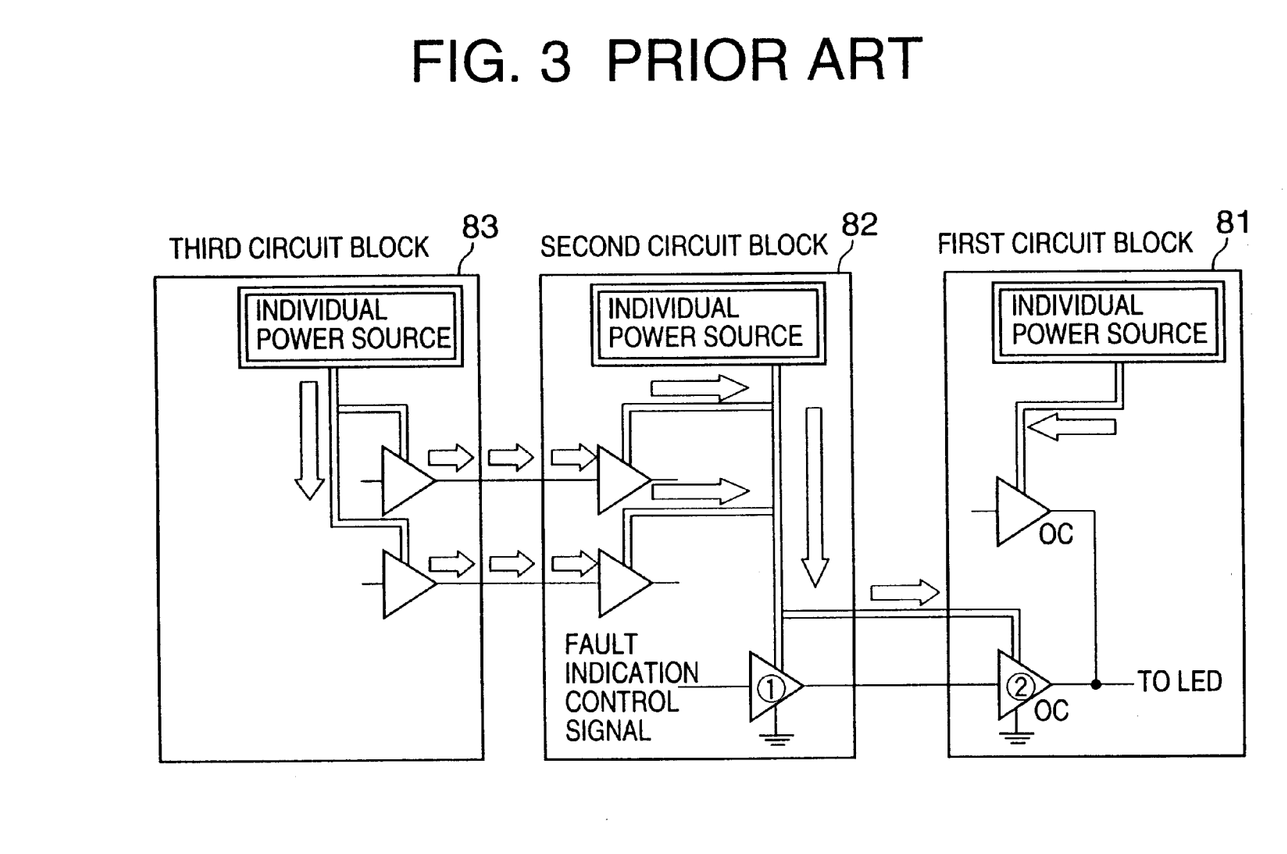
FIG. 3 shows the relationship between circuit blocks when a fault occurs in a power source.

FIGS. 2 and 3 show the relationship between circuit blocks when a fault occurs in an individual power source.

FIG. 2 shows a first circuit block 81, a second circuit block 82 adjacent to the first circuit block 81, and a third circuit block 83. Arrows in the figure indicate power supply paths.

In a normal state, when a fault occurs in an internal component other than the power source of the first circuit block 81, a fault indication signal is inputted into the open collector circuit of the first circuit block 81 to switch on the light-emitting diode LED, thereby indicating the fault occurrence. However, when a fault occurs in the power source in the first circuit block 81, power is supplied from the second circuit block 82, via the paths indicated by the arrows in FIG. 2, to drive the open collector circuit and the light-emitting diode LED.

FIG. 3 shows the power supply paths in a case where a fault occurs in the individual power source in the second block 82. In this case, a small amount of current flows from the third circuit block 83 into the second circuit block 82 via control signal conductors, as indicated by arrows. As a result, a voltage is applied to the power source line of the second circuit block 82, though it is out of order. Accordingly, a voltage lower than a predetermined value is applied to each of gate circuits (1) and (2) for transmitting fault indication control signals. If the gate circuit (1) does not operate while the gate circuit (2) is in operation, the output of the gate circuit (1) becomes unstable. Receiving the unstable output, the gate circuit (2) makes a wrong judgment to switch on the light-emitting diode of the first circuit block, which is not broken.

SUMMARY OF THE INVENTION

A general object of the present invention is to provide fault indicator circuits, in which the above disadvantages are eliminated.

A more specific object of the present invention is to provide a fault indicator circuit which does not wrongly indicate a fault in a circuit block when the fault occurs in another circuit block in a system having a plurality of circuit blocks each provided with an individual power source. When a fault occurs in the individual power source of a circuit block in the system, the circuit block needs to indicate the fault occurrence by itself.

The above objects of the present invention are achieved by a fault indicator circuit which indicates that a fault has occurred in an individual power source in a system having a plurality of circuit blocks each provided with an individual power source, the fault indicator circuit comprising:

a fault indicator which indicates a fault occurrence in response to a fault indication control signal from a first circuit block or one of other circuit blocks, and which indicates, when a fault has occurred in the first circuit block, a fault occurrence in the first circuit block supplied with power from the individual power source of one of the other circuit blocks; and an input determiner which is connected to an input terminal of a gate circuit into which the fault indication control signal from one of the other circuit blocks is inputted, and which lowers a level of each signal from an output circuit which outputs the fault indicator control signal from the other circuit blocks, thereby preventing the fault indicator of the first circuit block from being wrongly driven due to a fault in the individual power source of one of the other circuit blocks.

The above objects of the present invention are also achieved by a fault indicator circuit which indicates that a fault has occurred in a system having a plurality of circuit blocks each provided with an individual power source, comprising:

a fault indicator which indicates a fault occurrence in response to a fault indication control signal from a first circuit block of the circuit blocks or one of other circuit blocks, and which indicates, when a fault has occurred in the individual power source of the first circuit block, a fault occurrence in the first block supplied with power from the individual power source of one of the other circuit blocks; and a voltage reducing unit which reduces a voltage and is located between a power source input terminal of a gate circuit into which the fault indication control signal from one of the other circuit blocks is inputted and a power source for driving a circuit which outputs the fault indication control signal from one of the other circuit blocks. With this fault indicator circuit, when a fault occurs in the individual power source of one of the other circuit blocks, the fault indicator of the first circuit block can be prevented from being wrongly driven.

In accordance with the present invention, wrong fault indication in a monitored circuit block can be prevented when a fault occurs in the power source of a circuit block monitoring the power source of the monitored circuit block. Thus, unnecessary maintenance operations, such as replacing a properly working circuit block with a new one, can be avoided.

The above and other objects and features of the present invention will become more apparent from the following description taken in conjunction with the accompanying drawings.

DESCRIPTION OF THE PREFERRED EMBODIMENTS

The following is a description of embodiments of the present invention, with reference to the accompanying drawings.

Figure 4:
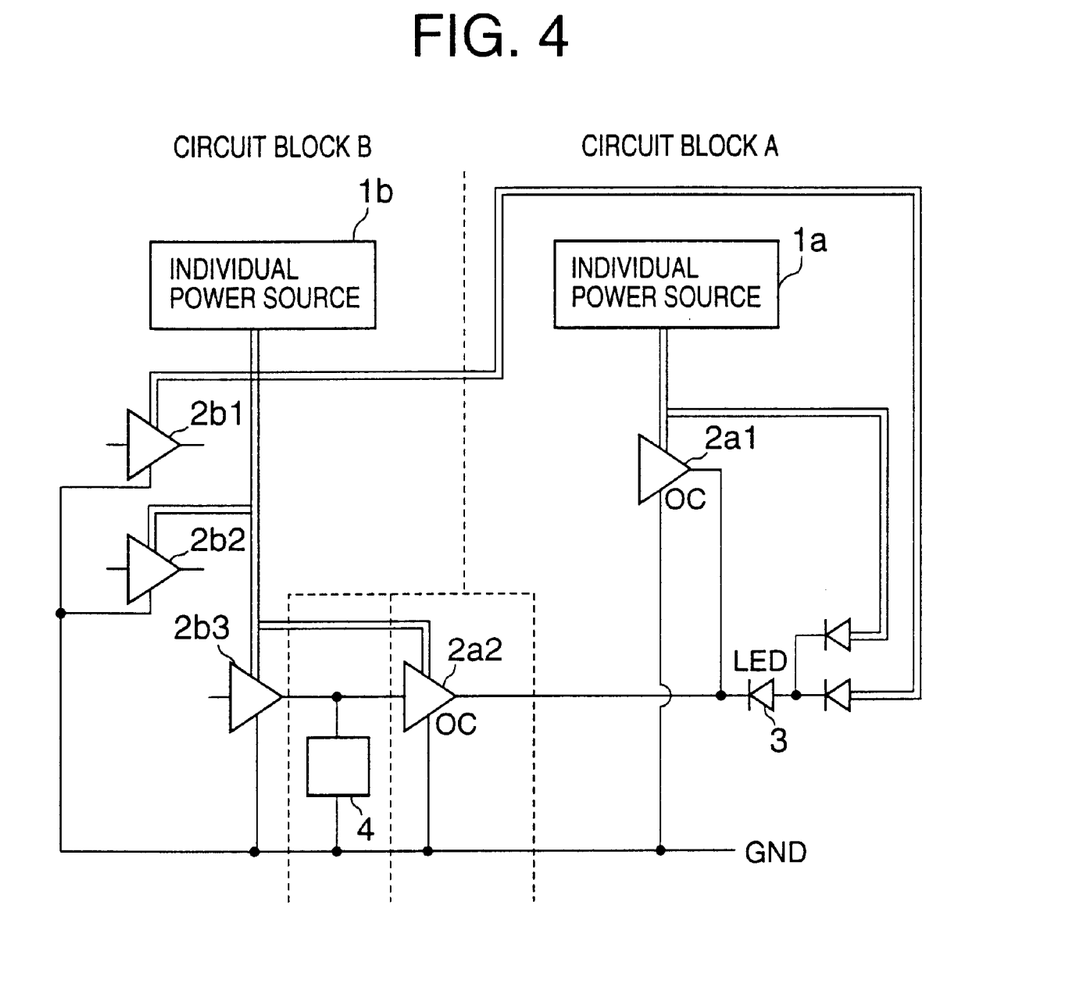
FIG. 4 shows a first principle of the present invention.

FIG. 4 shows a first principle of the present invention. In this figure, reference numeral $1a$ indicates an individual power source for a circuit block A, reference numeral $1b$ indicates an individual power source for a circuit block B, reference numerals $2a1$ and $2a2$ indicate open collector (OC) gate circuits of the circuit block A, reference numerals $2b1$ to $2b3$ indicate gate circuits of the circuit block B, reference numeral 3 indicates a fault indicator such as an LED, reference numeral 4 indicates an input determiner (such as a resistor or a diode) for the open collector gate circuit $2a2$, and GND stands for a ground (0V). The input determiner 4 can be arranged either in the circuit block A or in the circuit block B. The gate circuit $2a2$ supplied with power from the individual power source $1b$ of the circuit block B can also be arranged either in the circuit block A or in the circuit block B.

In FIG. 4, if the individual power source $1b$ of the circuit block B is out of order, unsteady power is supplied through control signals or the like inputted into the gate circuits $2b1$ and $2b2$, and the gate circuit $2b3$ originally driven by means of the individual power source $1b$ becomes unstable. Without the input determiner 4, the open collector gate circuit $2a2$ of the circuit block A is wrongly determined to have a fault, and the fault indicator 3 (LED) indicates to maintenance staff that there is a fault in the circuit block A provided with the individual power source $1a$. To solve the problem, the input determiner 4 is employed between the input terminal of the gate circuit $2a2$ and the ground (GND). As long as the individual power source $1b$ is in a normal operation state, a regular control signal outputted from the gate circuit $2b3$ is confirmed by the input determiner 4, and is then inputted into the gate circuit $2a2$.

If the individual power source $1b$ is out of order and the gate circuit $2b3$ is in an abnormal state (in which normal power is not supplied), the input determiner 4 fixes the input of the gate circuit $2a2$ at the ground level, and does not transmit a signal from the gate circuit $2b3$. The logic of the output of the gate circuit $2b3$ represents a fault at high level (at the power source voltage level), and represents a normal state at low level (at the ground level).

In this manner, when the individual power source $1b$ of the circuit block B is broken, the fault indicator 3 of the circuit block A can be prevented from wrongly indicating a fault. In this structure, when the individual power source $1a$ is broken, the gate circuit $2a1$ is driven so that power is supplied from the individual power source $1b$ to the fault indicator 3 to indicate a fault.

Figure 5:
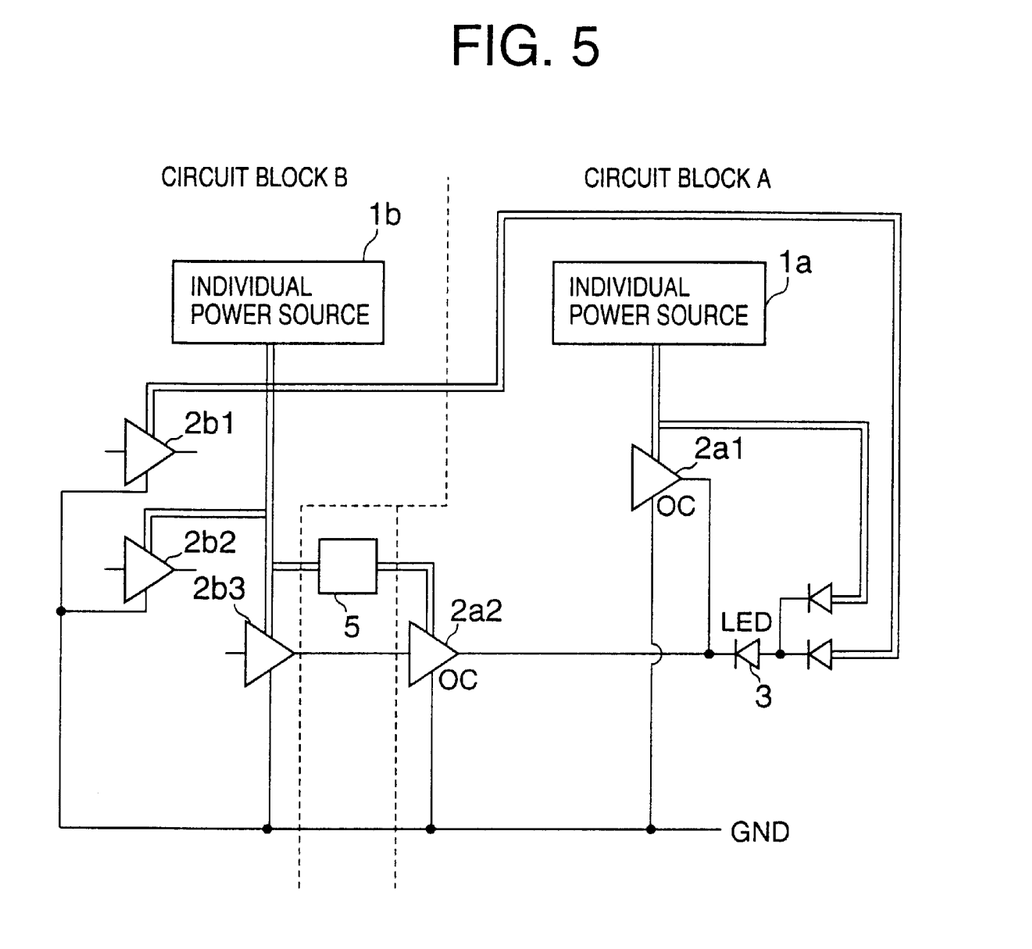
FIG. 5 shows a second principle of the present invention.

FIG. 5 shows a second principle of the present invention. In this figure, the same reference numerals as in FIG. 4 denote the same components as in FIG. 4. Reference numeral $1a$ indicates the individual power source of the circuit block A, and reference numeral $1b$ indicates the individual power source of the circuit block B. Reference numerals $2a1$ and $2a2$ indicate the open collector gate circuits of the circuit block A, and reference numerals $2b1$ to $2b3$ indicate the gate circuits of the circuit block B. Reference numeral 3 indicates a fault indicator, and reference numeral 5 indicates a voltage reducing means which reduces the power source voltage of the open collector gate circuit $2a2$. A resistor or a diode, for instance, constitutes the voltage reducing means 5.

In FIG. 5, when the individual power source 1*b* is broken, unstable power is supplied from control signals inputted into the gate circuits 2*b*1 and 2*b*2, and the gate circuit 2*b*3 originally supplied with power from the individual power source 1*b* becomes unstable accordingly. As a result, the gate circuit 2*a*2 of an open collector of the circuit block A wrongly determines that there is a fault, and switches on the light-emitting diode 3 to indicate maintenance staff that there is a fault in the circuit block A provided with the individual power source 1*a*. In accordance with the second principle of the present invention, however, the voltage reducing means 5 makes the power source voltage of the gate circuit 2*b*3 lower than the power source voltage of the gate circuit 2*b*3, so that a lower voltage is applied to the gate circuit 2*a*2.

In this manner, the gate circuit 2*a*2 cannot operate when the operation of the gate circuit 2*b*3 is unstable due to a fault in the individual power source 1*b*. Thus, when the individual power source 1*b* of the circuit block B is broken, the indicator 3 of the circuit block A can be prevented from wrongly indicating a fault. As in the first principle, the logic of the output of the gate circuit 2*b*3 (i.e., the input of the gate circuit 2*a*2) represents a fault at high level (at the power source voltage level), and represents a normal state at low level (at the ground level).

Figure 6:
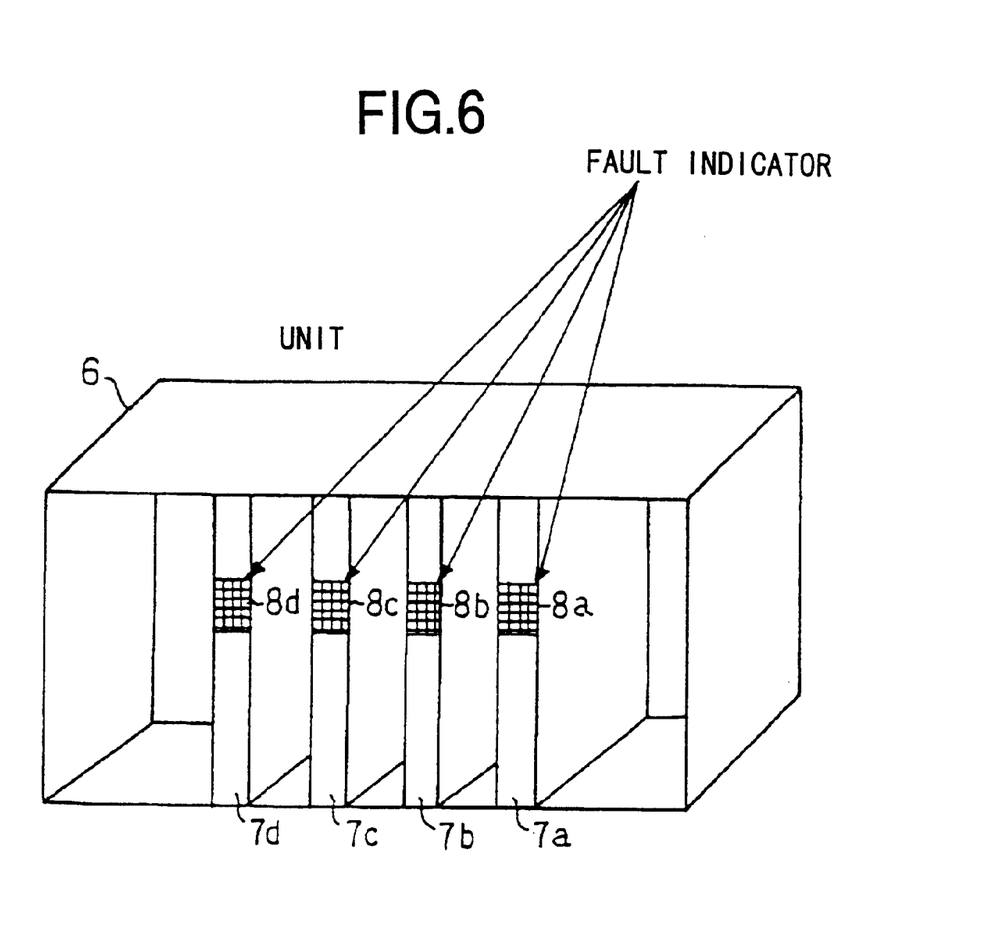
FIG. 6 shows the structure of a unit in accordance with the present invention.

FIG. 6 shows the structure of a unit in accordance with the present invention. In this figure, reference numeral 6 indicates the unit, reference numerals 7*a* to 7*d* indicate packages A to D, respectively, and reference numerals 8*a* to 8*d* indicate fault indicators corresponding to the respective packages A to D.

Figure 7:
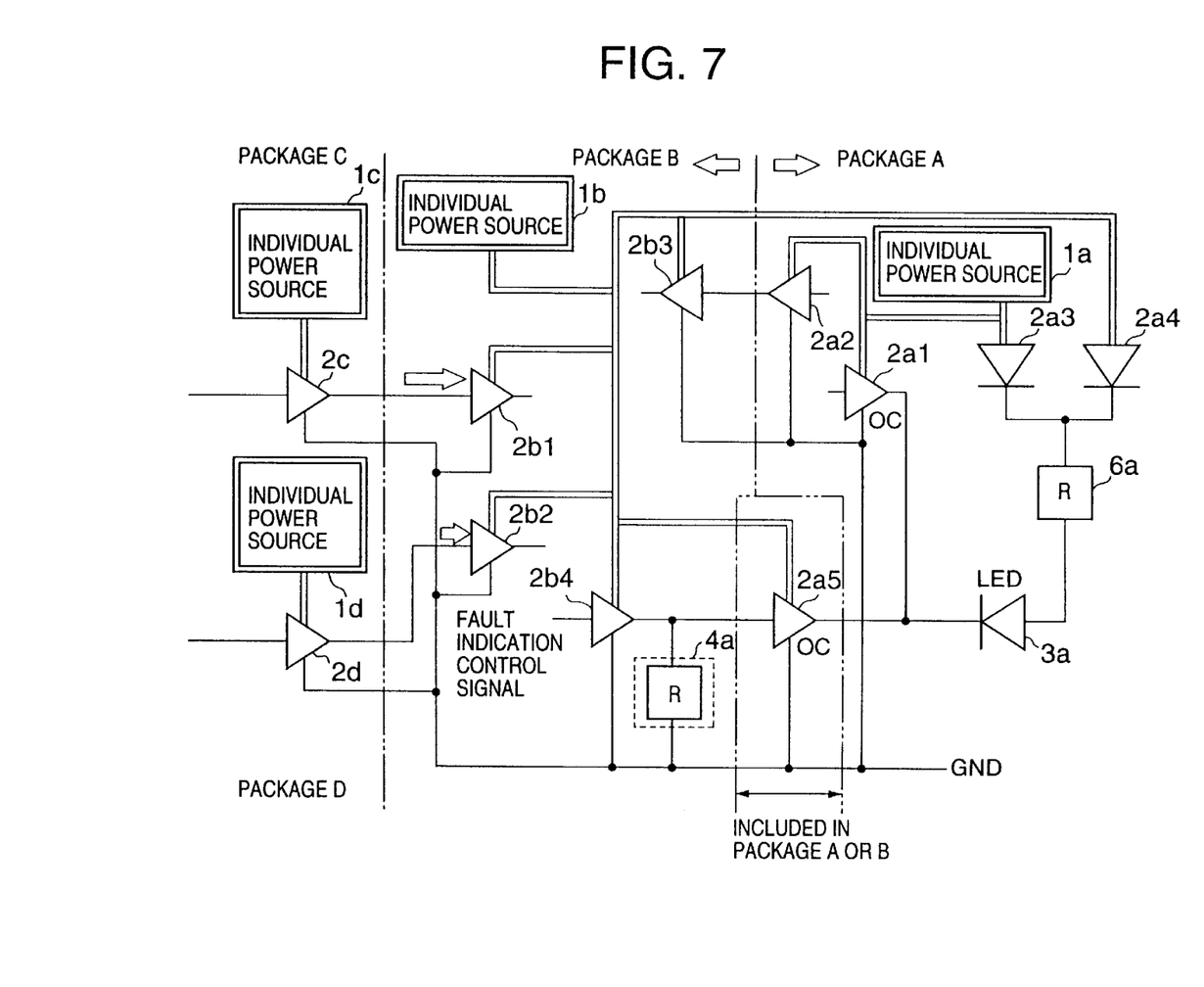
FIG. 7 is a circuit diagram of a first embodiment of the present invention.

FIG. 7 is a circuit diagram of a first embodiment of the present invention. In this embodiment, the first principle of the present invention shown in FIG. 4 is applied to the structure of the unit shown in FIG. 6.

In FIG. 7, reference numerals 1*a* to 1*d* indicate individual power sources provided for the packages A to D, and reference numerals 2*a*1 to 2*a*5, 3*a*, and 6*a* indicate circuits and elements disposed in the package A. More specifically, reference numeral 2*a*1 indicates an open collector gate circuit, reference numeral 2*a*2 indicates a gate circuit, reference numerals 2*a*3 and 2*a*4 indicate diodes, reference numeral 2*a*5 indicates an open collector gate circuit, reference numeral 3*a* indicates a fault indicating light-emitting diode (LED), and reference numeral 6*a* indicates an LED driving resistor (R) supplied with power from the individual power source 1*a* or 1*b* via the diode 2*a*3 or 2*a*4. Reference numeral 4*a* indicates a resistor (R) corresponding to the determiner 4 shown in FIG. 4, which confirms an input to the open collector gate circuit 2*a*5. The open collector gate circuit 2*a*5 and the resistor 4*a* can be arranged either in the package A or in the package B. Reference numerals 2*b*1, 2*b*2, and 2*b*3 in the package B indicate gate circuits which receive signals from the package C, the package D, and the package A, respectively. Reference numeral 2*b*4 indicates a gate circuit which receives a fault indication control signal from the package B itself and then transmits the signal to the package A. Reference numeral 2*c* in the package C and reference numeral 2*d* in the package D indicate gate circuits.

In the circuit configuration shown in FIG. 7, information is exchanged among the packages A to D, while the package B monitors the individual power source 1*a* of the package A. In this case, if the individual power source 1*b* of the package B is broken, the power source voltage of the package B might rise to a point where an IC circuit constituting the gate circuit 2*b*4 is activated, due to power supplied through the signal conductors sending information from the packages A, C, and D. In this embodiment, however, the resistor 4*a* fixes the input of the open collector gate circuit 2*a*5 at low level, so as to prevent the light-emitting diode 3*a* of the package A from being switched on. When the individual power source 1*b* of the package B is operating properly, the output of the gate circuit 2*b*4 is at a normal level in spite of the existence of the resistor 4*a*.

Figure 8:
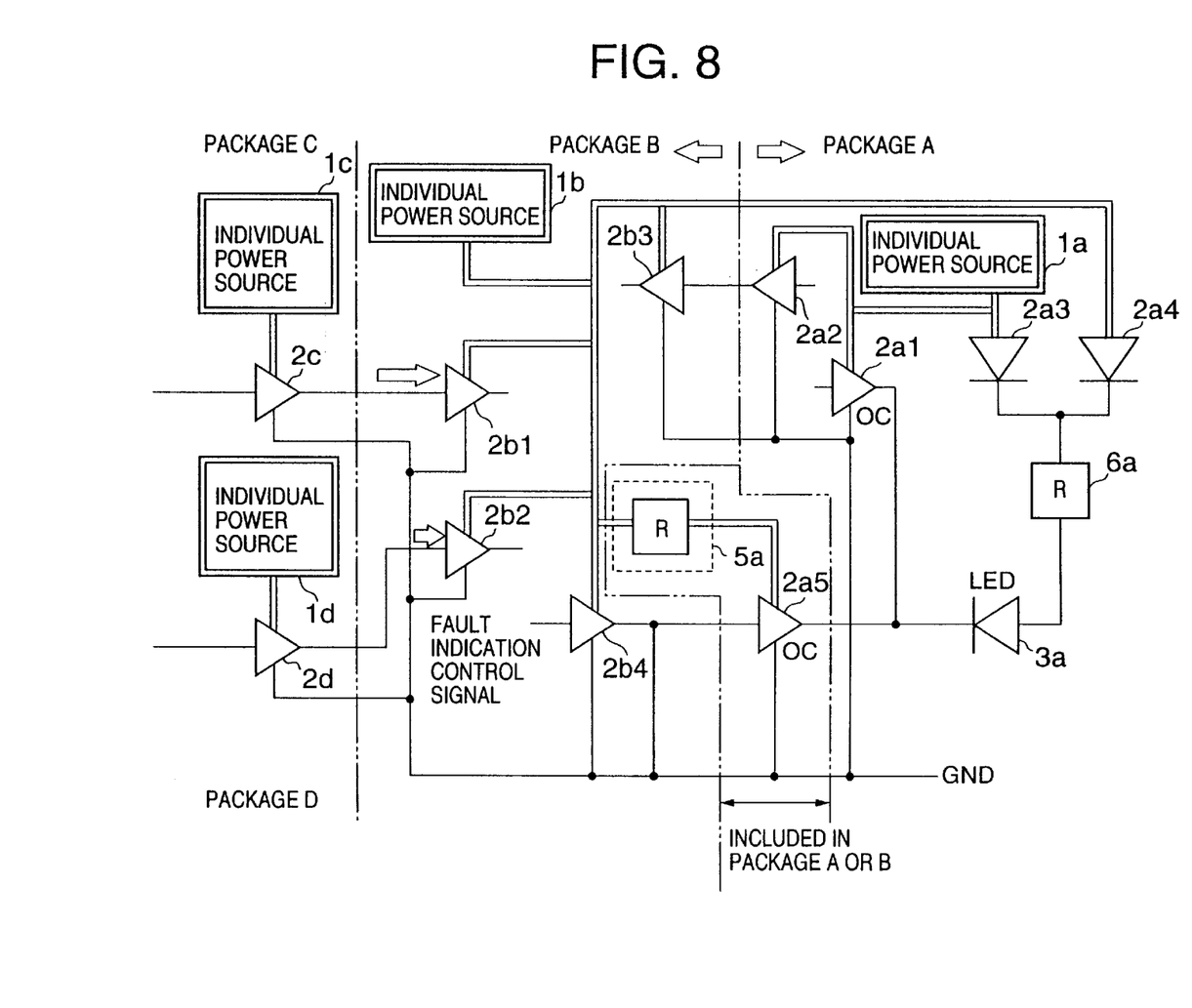
FIG. 8 is a circuit diagram of a second embodiment of the present invention.

FIG. 8 is a circuit diagram of a second embodiment of the present invention. In this embodiment, the second principle of the present invention shown in FIG. 5 is applied to the structure of the unit shown in FIG. 6.

In FIG. 8, the same components as in FIG. 7 are denoted by the same reference numerals. Reference numeral 5*a* corresponds to the voltage reducing means 5. Although a resistor constitutes the voltage reducing means 5*a* in this embodiment, it can be replaced by a diode. The gate circuit 2*a*5 and the resistor 5*a* can be arranged either in the package A or in the package B.

As in the first embodiment, information is exchanged among the packages A to D in this embodiment, and the package B monitors the individual power source 1*a* of the package A. In this structure, if the individual power source 1*b* of the package B is broken, the power source voltage of the package B might rise to a point where the IC circuit constituting the gate circuit 2*b*4 is activated, due to power supplied through the signal conductors sending information from the packages A, C, and D. In this embodiment, however, the resistor 5*a* further reduces the output voltage from the broken individual power source 1*b*, and the reduced voltage is supplied as power to the open collector gate circuit 2*a*5 that receives the output of the gate circuit 2*b*4 when the gate circuit 2*b*4 is not operating. Thus, the output of the gate circuit 2*a*5 can be kept at low level to prevent the light-emitting diode 3*a* for fault indication of the package A from being switched on.

The present invention is not limited to the specifically disclosed embodiments, but variations and modifications may be made without departing from the scope of the present invention.

The present application is based on Japanese priority application No. 11-195449, filed on Jul. 9, 1999, the entire contents of which are hereby incorporated by reference.

What is claimed is:

1. A fault indicator circuit which indicates that a fault has occurred in an individual power source in a system having a plurality of circuit blocks each provided with an individual power source, said fault indicator circuit comprising:

a fault indicator which indicates a fault occurrence in response to a fault indication control signal from a first circuit block or one of other circuit blocks, and which indicates, when a fault has occurred in the first circuit block, a fault occurrence in the first circuit block supplied with power from the individual power source of one of the other circuit blocks; and an input determiner which is connected to an input terminal of a gate circuit into which the fault indication control signal from one of the other circuit blocks is inputted, and which lowers a level of each signal from an output circuit which outputs the fault indicator control signal from the other circuit blocks, thereby preventing the fault indicator of the first circuit block from being wrongly driven due to a fault in the individual power source of one of the other circuit blocks.

2. The fault indicator circuit as claimed in claim 1, wherein:

the fault indicator is constituted by a light emitting diode; and the input determiner is constituted by a resistor or a diode.

3. A fault indicator circuit which indicates that a fault has occurred in a system having a plurality of circuit blocks each provided with an individual power source, comprising:

a fault indicator which indicates a fault occurrence in response to a fault indication control signal from a first circuit block of the circuit blocks or one of other circuit blocks, and which indicates, when a fault has occurred in the individual power source of the first circuit block, a fault occurrence in the first block supplied with power from the individual power source of one of the other circuit blocks; and a voltage reducing unit which reduces a voltage and is located between a power source input terminal of a gate circuit into which the fault indication control signal from one of the other circuit blocks is inputted and a power source for driving a circuit which outputs the fault indication control signal from one of the other circuit blocks, wherein when a fault occurs in the individual power source of one of the other circuit blocks, the fault indicator of the first circuit block is prevented from being wrongly driven.

4. The fault indicator circuit as claimed in claim 3, wherein:

the fault indicator is constituted by a light emitting diode; and the voltage reducing unit is constituted by a resistor or a diode.

* * * * *